US008782156B2

(12) United States Patent
Coleman et al.

(10) Patent No.: US 8,782,156 B2
(45) Date of Patent: Jul. 15, 2014

(54) ENHANCED MESSAGE DISPLAY

(75) Inventors: Keith J. Coleman, Mountain View, CA (US); Kevin Fox, Sunnyvale, CA (US); Jared Jacobs, Palo Alto, CA (US); Zhanna Shamis, Burlingame, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/616,955

(22) Filed: Sep. 14, 2012

(65) Prior Publication Data

US 2013/0013712 A1 Jan. 10, 2013

Related U.S. Application Data

(63) Continuation of application No. 13/086,354, filed on Apr. 13, 2011, which is a continuation of application No. 11/084,379, filed on Mar. 18, 2005, now Pat. No. 7,979,501, which is a continuation-in-part of application No. 10/914,035, filed on Aug. 6, 2004.

(51) Int. Cl.
*G06F 15/16* (2006.01)
*G06F 3/00* (2006.01)
*G06Q 30/00* (2012.01)

(52) U.S. Cl.
USPC ........... 709/206; 709/207; 709/231; 715/700; 715/738; 705/14.1; 705/27.1

(58) Field of Classification Search
USPC .................. 709/206, 207, 231; 715/700, 738; 705/27, 14
See application file for complete search history.

(56) References Cited

U.S. PATENT DOCUMENTS

| 5,208,748 A | 5/1993 | Flores et al. |
| 5,216,603 A | 6/1993 | Flores et al. |
| 5,479,408 A | 12/1995 | Will |
| 5,613,108 A | 3/1997 | Morikawa |
| 5,724,571 A | 3/1998 | Woods |

(Continued)

FOREIGN PATENT DOCUMENTS

| EP | 0886228 A2 | 1/2000 | |
| GB | 2 369 218 A * | 5/2002 | ............. G06F 17/60 |

(Continued)

OTHER PUBLICATIONS

Haas, N.; Bolle, R.; Dimitrova, N.; Janevski, A.; Zimmerman, J., "Personalized news through content augmentation and profiling," Image Processing. 2002. Proceedings. 2002 International Conference on , vol. 2, No., pp. II-9,II-12 vol. 2, 2002.*

(Continued)

*Primary Examiner* — Oscar Louie
*Assistant Examiner* — Taylor Elfervig
(74) *Attorney, Agent, or Firm* — Morgan, Lewis & Bockius LLP

(57) ABSTRACT

Informational items are displayed in a scrollable area of a message display. The informational items may be any number of type of items (e.g., RSS feeds, new items, images, application tips, and so on). A user is provided the ability to scroll forward and backward through the informational items. A user may choose the informational item (e.g., by clicking) and more detailed information about the informational item is presented to the user. Depending on the display view of the message application (e.g., InBox, conversation), different informational item types will have different probabilities of display. A user may customize the types of informational items to be displayed.

31 Claims, 10 Drawing Sheets

(56) References Cited

U.S. PATENT DOCUMENTS

| | | | |
|---|---|---|---|
| 5,734,837 | A | 3/1998 | Flores et al. |
| 5,740,549 | A * | 4/1998 | Reilly et al. .............. 705/14.42 |
| 5,761,689 | A | 6/1998 | Rayson et al. |
| 5,832,502 | A | 11/1998 | Durham et al. |
| 5,872,925 | A | 2/1999 | Han |
| 5,905,863 | A | 5/1999 | Knowles et al. |
| 5,913,040 | A | 6/1999 | Rakavy et al. |
| 5,948,058 | A | 9/1999 | Kudoh et al. |
| 5,959,621 | A | 9/1999 | Nawaz et al. |
| 6,021,427 | A | 2/2000 | Spagna et al. |
| 6,029,164 | A | 2/2000 | Birrell et al. |
| 6,085,206 | A | 7/2000 | Domini et al. |
| 6,151,596 | A | 11/2000 | Hosomi |
| 6,182,063 | B1 | 1/2001 | Woods |
| 6,182,098 | B1 | 1/2001 | Selker |
| 6,185,551 | B1 | 2/2001 | Birrell et al. |
| 6,330,589 | B1 | 12/2001 | Kennedy |
| 6,350,066 | B1 | 2/2002 | Bobo, II |
| 6,396,513 | B1 | 5/2002 | Helfman et al. |
| 6,408,297 | B1 | 6/2002 | Ohashi |
| 6,421,694 | B1 | 7/2002 | Nawaz et al. |
| 6,438,564 | B1 | 8/2002 | Morton et al. |
| 6,493,702 | B1 | 12/2002 | Adar et al. |
| 6,493,703 | B1 | 12/2002 | Knight et al. |
| 6,507,351 | B1 | 1/2003 | Bixler |
| 6,549,957 | B1 | 4/2003 | Hanson et al. |
| 6,594,658 | B2 | 7/2003 | Woods |
| 6,594,693 | B1 | 7/2003 | Borwankar |
| 6,606,644 | B1 | 8/2003 | Ford et al. |
| 6,640,239 | B1 | 10/2003 | Gidwani |
| 6,665,668 | B1 | 12/2003 | Sugaya et al. |
| 6,683,627 | B1 | 1/2004 | Ullmann et al. |
| 6,708,205 | B2 | 3/2004 | Sheldon et al. |
| 6,725,228 | B1 | 4/2004 | Clark et al. |
| 6,742,042 | B1 | 5/2004 | Holden et al. |
| 6,745,197 | B2 | 6/2004 | McDonald |
| 6,757,889 | B1 | 6/2004 | Ito |
| 6,771,291 | B1 | 8/2004 | DiStefano, III |
| 6,785,869 | B1 | 8/2004 | Berstis |
| 6,820,081 | B1 | 11/2004 | Kawai et al. |
| 6,834,276 | B1 | 12/2004 | Jensen et al. |
| 6,889,361 | B1 | 5/2005 | Bates et al. |
| 6,892,196 | B1 | 5/2005 | Hughes |
| 6,973,481 | B2 | 12/2005 | MacIntosh et al. |
| 7,010,616 | B2 | 3/2006 | Carlson et al. |
| 7,017,173 | B1 | 3/2006 | Armstrong et al. |
| 7,035,903 | B1 | 4/2006 | Baldonado |
| 7,043,690 | B1 | 5/2006 | Bates et al. |
| 7,069,300 | B2 | 6/2006 | Toyota et al. |
| 7,089,278 | B1 | 8/2006 | Churchill et al. |
| 7,107,544 | B1 | 9/2006 | Luke |
| 7,120,668 | B2 | 10/2006 | Manber et al. |
| 7,139,850 | B2 | 11/2006 | Amemiya et al. |
| 7,143,135 | B2 | 11/2006 | Smith et al. |
| 7,171,429 | B2 | 1/2007 | Frieden et al. |
| 7,206,388 | B2 | 4/2007 | Diacakis |
| 7,213,210 | B2 | 5/2007 | Reysa |
| 7,222,299 | B1 | 5/2007 | Lim et al. |
| 7,328,242 | B1 | 2/2008 | McCarthy et al. |
| 7,340,674 | B2 | 3/2008 | Newman |
| 7,356,772 | B2 | 4/2008 | Brownholtz et al. |
| 7,359,936 | B2 | 4/2008 | Gruen et al. |
| 7,383,250 | B2 | 6/2008 | Scian et al. |
| 7,383,307 | B2 | 6/2008 | Kirkland et al. |
| 7,386,439 | B1 | 6/2008 | Charnock et al. |
| 7,412,437 | B2 | 8/2008 | Moody et al. |
| 7,421,690 | B2 | 9/2008 | Forstall et al. |
| 7,433,920 | B2 | 10/2008 | Blagsvedt et al. |
| 7,472,357 | B1 | 12/2008 | Satterfield et al. |
| 7,484,175 | B2 | 1/2009 | Kirkland |
| 7,523,222 | B2 | 4/2009 | Carlson |
| 7,565,534 | B2 | 7/2009 | Starbuck et al. |
| 7,599,852 | B2 | 10/2009 | Borsage et al. |
| 7,693,866 | B1 | 4/2010 | Weaver et al. |
| 7,716,593 | B2 | 5/2010 | Durazo et al. |
| 7,730,113 | B1 | 6/2010 | Payette et al. |
| 7,788,326 | B2 | 8/2010 | Buchheit et al. |
| 7,904,510 | B2 | 3/2011 | Anderson et al. |
| 7,912,904 | B2 | 3/2011 | Buchheit et al. |
| 8,265,670 | B2 | 9/2012 | Yasuda et al. |
| 2001/0016845 | A1 | 8/2001 | Tribbensee |
| 2001/0042100 | A1 | 11/2001 | Guedalia et al. |
| 2001/0047294 | A1 | 11/2001 | Rothschild |
| 2002/0010775 | A1 | 1/2002 | Rakavy et al. |
| 2002/0073156 | A1 | 6/2002 | Newman |
| 2002/0108125 | A1 | 8/2002 | Joao |
| 2002/0169841 | A1 | 11/2002 | Carlson et al. |
| 2002/0188683 | A1 | 12/2002 | Lytle et al. |
| 2002/0194229 | A1 | 12/2002 | Decime et al. |
| 2003/0009385 | A1 | 1/2003 | Tucciarone et al. |
| 2003/0020749 | A1 | 1/2003 | Abu-Hakima et al. |
| 2003/0055711 | A1 | 3/2003 | Doherty |
| 2003/0093315 | A1 | 5/2003 | Sato |
| 2003/0101065 | A1 | 5/2003 | Rohall et al. |
| 2003/0110227 | A1 | 6/2003 | O'Hagan |
| 2003/0120737 | A1 | 6/2003 | Lytle et al. |
| 2003/0135555 | A1 | 7/2003 | Birrell et al. |
| 2003/0145285 | A1 | 7/2003 | Miyahira et al. |
| 2003/0158903 | A1 | 8/2003 | Rohall et al. |
| 2003/0163537 | A1 | 8/2003 | Rohall et al. |
| 2003/0167310 | A1 | 9/2003 | Moody et al. |
| 2003/0177190 | A1 | 9/2003 | Moody et al. |
| 2003/0229607 | A1 | 12/2003 | Zellweger et al. |
| 2003/0233419 | A1 | 12/2003 | Beringer |
| 2004/0015553 | A1 | 1/2004 | Griffin et al. |
| 2004/0044735 | A1 | 3/2004 | Hoblit |
| 2004/0054737 | A1 * | 3/2004 | Daniell .................. 709/206 |
| 2004/0059712 | A1 | 3/2004 | Dean et al. |
| 2004/0078432 | A1 | 4/2004 | Manber et al. |
| 2004/0083265 | A1 | 4/2004 | Beringer |
| 2004/0098488 | A1 | 5/2004 | Mayers |
| 2004/0133564 | A1 | 7/2004 | Gross et al. |
| 2004/0153509 | A1 | 8/2004 | Alcorn et al. |
| 2004/0186766 | A1 * | 9/2004 | Fellenstein et al. ............ 705/14 |
| 2004/0199589 | A1 | 10/2004 | Keohane et al. |
| 2004/0205141 | A1 | 10/2004 | Goland |
| 2004/0210587 | A1 | 10/2004 | Reysa |
| 2004/0260710 | A1 | 12/2004 | Marston et al. |
| 2004/0260756 | A1 | 12/2004 | Forstall et al. |
| 2004/0267700 | A1 | 12/2004 | Dumais et al. |
| 2005/0004990 | A1 | 1/2005 | Durazo et al. |
| 2005/0060643 | A1 | 3/2005 | Glass et al. |
| 2005/0080859 | A1 | 4/2005 | Lake |
| 2005/0086096 | A1 | 4/2005 | Bryant |
| 2005/0086598 | A1 | 4/2005 | Marshall, III et al. |
| 2005/0091320 | A1 | 4/2005 | Kirsch et al. |
| 2005/0108345 | A1 | 5/2005 | Suzuki |
| 2005/0114781 | A1 | 5/2005 | Brownholtz et al. |
| 2005/0138002 | A1 | 6/2005 | Giacobbe et al. |
| 2005/0144157 | A1 | 6/2005 | Moody et al. |
| 2005/0144241 | A1 | 6/2005 | Stata et al. |
| 2005/0198172 | A1 | 9/2005 | Appelman et al. |
| 2005/0198173 | A1 | 9/2005 | Evans |
| 2005/0198256 | A1 | 9/2005 | Moody et al. |
| 2005/0204009 | A1 | 9/2005 | Hazarika et al. |
| 2005/0223061 | A1 | 10/2005 | Auerbach et al. |
| 2005/0223066 | A1 | 10/2005 | Buchheit et al. |
| 2005/0223067 | A1 | 10/2005 | Buchheit et al. |
| 2005/0223072 | A1 | 10/2005 | Greve et al. |
| 2005/0289468 | A1 * | 12/2005 | Kahn et al. .................. 715/738 |
| 2006/0026593 | A1 | 2/2006 | Canning et al. |
| 2006/0031304 | A1 | 2/2006 | Bagga et al. |
| 2006/0085502 | A1 | 4/2006 | Sundararajan et al. |
| 2006/0123091 | A1 | 6/2006 | Ho |
| 2006/0128404 | A1 | 6/2006 | Klassen et al. |
| 2006/0168067 | A1 | 7/2006 | Carlson et al. |
| 2006/0248209 | A1 | 11/2006 | Chiu et al. |
| 2007/0047697 | A1 | 3/2007 | Drewry et al. |
| 2007/0067404 | A1 | 3/2007 | Brown et al. |
| 2007/0143411 | A1 | 6/2007 | Costea et al. |
| 2007/0143428 | A1 | 6/2007 | Kumar et al. |
| 2007/0198639 | A1 | 8/2007 | Litwin et al. |
| 2007/0255791 | A1 | 11/2007 | Bodlaender et al. |
| 2008/0091656 | A1 | 4/2008 | Charnock et al. |

(56) References Cited

U.S. PATENT DOCUMENTS

| | | | |
|---|---|---|---|
| 2008/0147815 | A1 | 6/2008 | Damm et al. |
| 2008/0281813 | A1 | 11/2008 | Moody et al. |
| 2008/0313292 | A1 | 12/2008 | Forstall et al. |
| 2009/0030774 | A1* | 1/2009 | Rothschild et al. ............ 705/10 |
| 2009/0089292 | A1 | 4/2009 | Cheah |
| 2010/0030798 | A1 | 2/2010 | Kumar et al. |
| 2010/0241700 | A1 | 9/2010 | Rasmussen et al. |
| 2011/0225249 | A1 | 9/2011 | Forstall et al. |
| 2011/0264750 | A1 | 10/2011 | Fabre et al. |
| 2012/0185797 | A1 | 7/2012 | Thorsen et al. |
| 2012/0209853 | A1 | 8/2012 | Desai et al. |

FOREIGN PATENT DOCUMENTS

| | | | |
|---|---|---|---|
| JP | 9128407 | A | 5/1997 |
| JP | 11-015763 | | 1/1999 |
| JP | 2001-222477 | A | 8/2001 |
| JP | 2002-359667 | A | 12/2002 |
| JP | 2003-030216 | | 1/2003 |
| JP | 2003-108278 | | 4/2003 |
| JP | 2004-173124 | | 6/2004 |
| JP | 2005-536790 | A | 2/2005 |
| WO | WO 00/23931 | | 4/2000 |
| WO | WO 01/61551 | A1 | 8/2001 |
| WO | WO 03/058519 | A2 | 7/2003 |
| WO | WO 03/067497 | A1 | 8/2003 |

OTHER PUBLICATIONS

Anupam, V.; Breitbart, Y.; Freire, J.; Kumar, B., "Personalizing the Web using site descriptions," Database and Expert Systems Applications, 1999. Proceedings. Tenth International Workshop on , vol., No., pp. 732,738, 1999.*
Google Inc., Office Action, CN 200580016413.8, Dec. 4, 2012, 6 pgs.
Comer, D. and Peterson, L., "Conversation-Based Mail," ACM Transactions on Computer Systems (TOCS) vol. 4, Issue 4, pp. 299-319, Nov. 1986.
Bellotti, V et al., (2003), "Taking Email to Task: the design and evaluation of a task management centered email tool." In Conference Proceedings on Human Factors in Computing Systems (CHI2003), pp. 345-352, Apr. 5-10, 2003, Fort Lauderdale, Florida.
Bellotti, V. et al., "Taskmaster: recasting email as task management," PARC, CSCW '02 Workshop on Redesigning Email for the 21st Century.
Flores, F. et al., "Computer Systems and the design of organizational interaction," ACM Transactions on Information Systems., pp. 153-172, (1988).
Shepherd, A. et al., "Strudel-an extensible electronic conversation toolkit," Proceedings of the 1990 ACM Conference on Computer-supported Cooperative Work, Los Angeles, California, United States, pp. 93-104.
Venolia, G., et al., "Supporting Email Workflow, "Technical Report MSR-TR-2001-88, Microsoft Corporation, 10 pages (Sep. 2001).
Winograd, T., (1987), "A language/action perspective on the design of cooperative work," Human-Computer Interaction, vol. 3 No. 1, pp. 3-30, (1987-1988). Earlier version presented at the Conference on Computer-supported Cooperative Work, Austin, pp. 203-220, Dec. 1986.
Winograd, T., "Where the Action is," pp. 256A-260, Byte, Dec. 1988.
Zawinski, J., "Message Threading," http://www.jwz.org/doc/threading.html, pp. 1-9 (1997-2000).
About Microsoft Word screen shot, May 28, 2007, 1 page.
Apple Computer Inc, *Mail 1.3.3. Help: Checking Spelling in Email*, http://docs.info.apple.com/article.html?artnum=151474, Feb. 18, 2004, 1 page.
Courter et al., *Mastering Microsoft Office 2000—Professional Edition*, 1999 published by Sybex Inc., pp. 36-37 and 92-94.
Courter et al., *Mastering Microsoft Office 2000—Professional Edition*, 1999 published by Sybex Inc., 3 pages.
International Search Report, PCT/US2005/010137, Jun. 3, 2005, 4 pages.
O'Hara, Easy Microsoft Outlook 2003, Que, Sep. 18, 2003, 44 pages.
Russell et al., Special Edition Using Microsoft Office Outlook 2003, Que, Sep. 25, 2003, 102 pages.
Syroid et al., Outlook 2000 in a Nutshell, O'Reilly Media, May 2, 2000, pp. 1-66.
Tobias, D., "Dan's Mail Format Site," http://web.archive.org/web/2003/820225908/http://mailformat.dan.info/config/yahoo.html, Aug. 3, 2003, 6 pages.
Apple Computer Inc., Mac Mail Utility Screenshot, Aug. 18, 2004, 1 pg.
Screenshot of Reply in Lotus Notes 6.5, Aug. 6, 2007, 1 pg.
International Preliminary Report on Patentability for PCT/US2005/006826 dated Oct. 4, 2006, 4 pgs.
International Search Report and Written Opinion for PCT/US05/06826 dated Jun. 26, 2006, 7 pgs.
Supplementary European Search Report for EP 05724384.2 dated Mar. 16, 2009, 5 pgs.
Google Inc., Office Action, Australian Patent Application No. 2011201989, Apr. 12, 2012, 3 pgs.
Google Inc., Office Action, Australian Patent Application No. 2011201993, Feb. 28, 2012, 2 pgs.
Google Inc., Office Action, Australian Patent Application No. 2011201994, Mar. 8, 2012, 2 pgs.
Lawrence, Context and Page Analysis for Improved Web Search, IEEE Internet Computing, Jul.-Aug. 1998, pp. 38-46.
Google Inc., Office Action, Australian Patent Application No. 2011201991, Mar. 8, 2012, 2 pages.
Tyson, Sams Teach Yourself Microsoft Outlook 2000 in 24 hours, 1999, 2 pgs.
Google Inc., European Search Report, EP 11172427.4, Dec. 21, 2011, 6 pgs.
Google Inc., Office Action, AU 2011203058, Oct. 31, 2011, 1 pg.
Google Inc., Office Action, CN 200580016413.8, Dec. 19, 2011, 3 pgs.
Google Inc., Office Action, KR 2011-7017094, Sep. 26, 2011, 5 pgs.
Google Inc., Office Action, KR 2011-7017095, Sep. 29, 2011, 5 pgs.
Google Inc., Office Action, KR 2011-7017096, Oct. 4, 2011, 4 pgs.
Google Inc., Office Action, KR 2011-7017098, Oct. 4, 2011, 3 pgs.
Google Inc., Office Action, KR 2011-7017102, Oct. 4, 2011, 4 pgs.
Google Inc., Office Action, KR 2006-7022840, Jan. 26, 2012, 4 pgs.
Resnick, Network Working Group, RFC 2822, Jan. 26, 2012, 4 pgs.
Google Inc., Notice of Acceptance, AU 2011203058, Jan. 6, 2012, 3 pgs.
Elsas, Retrieval and Feedback Models for Blog Feed Search, SIGIR '08, Jan. 1, 2008, 8 pgs.
Google Inc., International Search Report/Written Opinion, PCT/US2012/046872, Sep. 28, 2012, 11 pgs.
Google Inc., European Search Report, EP 12183097.0, Nov. 5, 2012, 7 pgs.
Google Inc., European Search Report, EP 12183103.6, Nov. 5, 2012, 7 pgs.
Google Inc., Office Action, Australian Patent Application 2011201992, Aug. 16, 2012, 3 pgs.
Google Inc., Office Action, Australian Patent Application 2011201993, Oct. 11, 2012, 3 pgs.
Google Inc., Office Action, Chinese Patent Application 200580016413.8, Jul. 2, 2012, 3 pgs.
Google Inc., Office Action, IN 1262/MUMNP/2006, Sep. 27, 2011, 4 pgs.
Google Inc., Office Action, JP 2010-275595, Jul. 6, 2012, 4 pgs.
Google Inc., Office Action, JP 2011-181202, Aug. 29, 2012, 3 pgs.
Google Inc., Office Action, JP 2011-181203, Aug. 27, 2012, 3 pgs.
Google Inc., Office Action, JP 2011-181204, Aug. 27, 2012, 3 pgs.
Google Inc., Office Action, JP 2011-181205, Aug. 29, 2012, 4 pgs.
Lin, Modeling Semantics and Structure of Discussion Threads, WWW'09, Jan. 1, 2009, 2 pg.
Miura, Rapid Search for a Target Webpage, to Master a New-Standard Search Engine "Google", Nikkei PC 21, V8, N11, Jun. 1, 2003, 9 pgs.
Reaction, Improving Search Technique for the Internet, Ultimate Search Technicuq, PC Japan, V8, N5, May 1, 2003, 7 pgs.
Seo, Online Community Search Using Conversational Structures, V14, N6, Apr. 23, 2011, 26 pgs.

(56) References Cited

OTHER PUBLICATIONS

Google Inc., Office Action, EP 05724384.2, Nov. 23, 2012, 7 pgs.
Bitmap Index, Internet Citation, en.wikipedia.org/wiki/Bitmap_index, Oct. 5, 2010, 5 pgs.
Google Inc., Decision to Grant a Patent, JP 2011-181202, Mar. 7, 2013, 1 pg.
Google Inc., Decision to Grant a Patent, JP 2011-181203, Mar. 11, 2013, 1 pg.
Google Inc., Decision to Grant a Patent, JP 2011-181204, Mar. 11, 2013, 1 pg.
Google Inc., Extended European Search Report, EP 12192299.1, Mar. 6, 2013, 7 pgs.
Google Inc., ISR/WO, PCT/US2012/046876, Feb. 22, 2013, 12 pgs.
Google Inc., Notice of Acceptance, AU 2011201989, Oct. 27, 2012, 3 pgs.
Google Inc., Notice of Acceptance, AU 2011201993, Mar. 21, 2013, 3 pgs.
Google Inc., Office Action, JP 2011-181205, Mar. 11, 2013, 4 pgs.
Navarro, Indexing and Searching, Modern Information Retrieval, Ch. 8, Jan. 1, 1999, pp. 191-228.
Ogilvie, Experiments with Language Models for Known-Item Finding of Email Messages, TREC 2005, Nov. 15-18, 2005, 10 pgs.
Rohall, Email Visualizations to Aid Communications, IEEE Symposium on Information Visualization (InfoVis), 2001, p. 1-4.
Venolia, Understanding Sequence and Replay Relationships within Email Conversations: A Mixed-Model Visualization, CHI 2003, Ft. Lauderdale FL, Apr. 5-10, 2003, pp. 361-368.
Autonomy webpage, http://autonomy.com, 2004, 1 pg.
Cordess, Taking a Look at Zoe, Google Your Email, Apr. 26, 2004, 1 pg.
DolphinSearch webpage, www.dolphinsearch.com, 2004, 1 pg.
eCommerce Customer Service: Email Management Systems that Work, eGain Corporation White Paper, 1998, 9 pgs.
Electronic Discovery Solutions from DolphinSearch, www.dolphinsearch.com, 2003, 1 pg.
Enfish webpage, www.enfish.com, 2004, 1 pg.
Flenner, Replace Those Shared Drives With Space Drives, O'Reilly on Java.com, Aug. 28, 2002, 7 pgs.
Friedman, The Dashboard, 2003, 2 pgs.
Gelernter, Expert Voice: David Gelernter on Knowledge Management, Cioinsight, Oct. 10, 2002, 6 pgs.
Google Inc., ISR/WO, PCT/US2005/031920, May 3, 2006, 3 pgs.
Kanellos, Microsoft Aims for Search on Its Own Terms, c/net News.com, Nov. 24, 2003, 4 pgs.
Lotus Discovery Server webpage, lotus.com/product/disccserver.nsf, 2004, 1 pg.
My Take on Dashboard: Multiple Desktops Done Differently, engadgeted.net, Jul. 23, 2004, 2 pgs.
Opera Mail Client, Opera M2 webpage, www.opera.com/products/desktop/m2, Jun. 2004, 3 pgs.
Placeless Documents, Xerox Corporation, www2.parc.com/csl/projects/placeless, 1999, 2 pgs.
Searching ZoeDocs, zoe.omara.ca/index.ph?page=searching, Dec. 2003, 3 pgs.
The Apache Jakarta Project, jakarta.apache.org/lucene/docs/indes.htlm, 2004, 1 pg.
Udell, Googling Your Email, O'Reilly Network, Oct. 7, 2002, 4 pgs.
What Does Autonomy Do?, http://www.autonomy.com/content/home, 2003, 5 pgs.
X1 About Us, www.x1.com/abou_us/, 2004, 1 pg.
X1 Enterprise Edition product page, www.x1.com/?PROGOOG, 2004, 2 pgs.
ZoeDocs, http://zoe.omara.ca/LikeZoe, Nov. 2003, 1 pg.

\* cited by examiner

| Display View | Information type | | | | |
|---|---|---|---|---|---|
| | RSS Feed | Advertisement | Stock Price | News Item | ... | Other |
| InBox | .10 | .10 | .10 | .60 | | .10 |
| Conversation | .10 | .75 | .05 | .05 | | .05 |
| Compose | .10 | .50 | .05 | .30 | | .05 |
| Contact Entry | .20 | .05 | .05 | .60 | | .00 |
| ... | | | | | | |
| Other | .20 | .05 | .05 | .60 | | .00 |

Figure 4

ENHANCED MESSAGE DISPLAY

RELATED APPLICATIONS

This application is a continuation of U.S. application Ser. No. 13/086,354, filed Apr. 13, 2011, which is a continuation of U.S. application Ser. No. 11/084,379, filed Mar. 18, 2005, now U.S. Pat. No. 7,979,501, entitled "Enhanced Message Display," which is a continuation-in-part of U.S. patent application Ser. No. 10/914,035, filed Aug. 6, 2004. All of the above applications are incorporated by reference herein in their entirety.

TECHNICAL FIELD

The present invention relates generally to the field of client-server computer network systems, and in particular to providing informational items to a user in conjunction with an application program.

BACKGROUND

Every day, people send and receive millions of email (also written as "e-mail") messages over computer networks for business and leisure. Email, being convenient, easy to use and close to instantaneous in many cases, has become an extremely popular communication channel for people to exchange information.

Traditionally, email messages arriving at a user's email account are displayed by a dedicated email client or in a web browser window individually, in a chronological order, e.g., the most recent message appears at top of the browser window while the oldest one appears at the bottom of the browser window. Newer applications may provide for a conversation-based approach to viewing and interacting with e-mail messages (e.g., messages are grouped together based on their relationship to each other).

SUMMARY

According to some aspects of the invention, a method (e.g., a method performed at a server) for enhancing client message display includes identifying a display view type of a client message display, where the client message display displays client message information. At least one informational item is identified in accordance with the identified display view type. The at least one informational item is formatted for the client message display as an item in a scrollable display area and the formatted at least one informational item is sent to a client device.

According to some aspects of the invention, a method (e.g., a method performed at a client) for enhancing client message display on a client device includes identifying a display view type of a client message display, where the client message display is for displaying client message information. At least one informational item is identified in accordance with the identified display view type and the at least one informational item for the client message display is displayed as an item in a scrollable display area.

BRIEF DESCRIPTION OF THE DRAWINGS

The aforementioned features and advantages of the invention as well as additional features and advantages thereof will be more clearly understood hereinafter as a result of a detailed description of embodiments of the invention when taken in conjunction with the drawings. Like reference numerals refer to corresponding parts throughout the several views of the drawings.

FIG. 4 depicts a data structure for storing probabilities of displays in accordance with some embodiments of the present invention.

DESCRIPTION OF EMBODIMENTS

According to some embodiments of the invention, informational items may be displayed in a scrollable area of a message display. The informational items may be any number of type of items (e.g., RSS feeds, new items, images, application tips, and so on). A user is provided the ability to scroll forward and backward through the informational items. A user may select the informational item (e.g., by clicking) and more detailed information about the informational item is presented to the user. In some embodiments, depending on the display view of the message application (e.g., InBox, conversation), different informational item types will have different probabilities of display. In some embodiments, a user may customize the types of informational items to be displayed.

Figure 1:
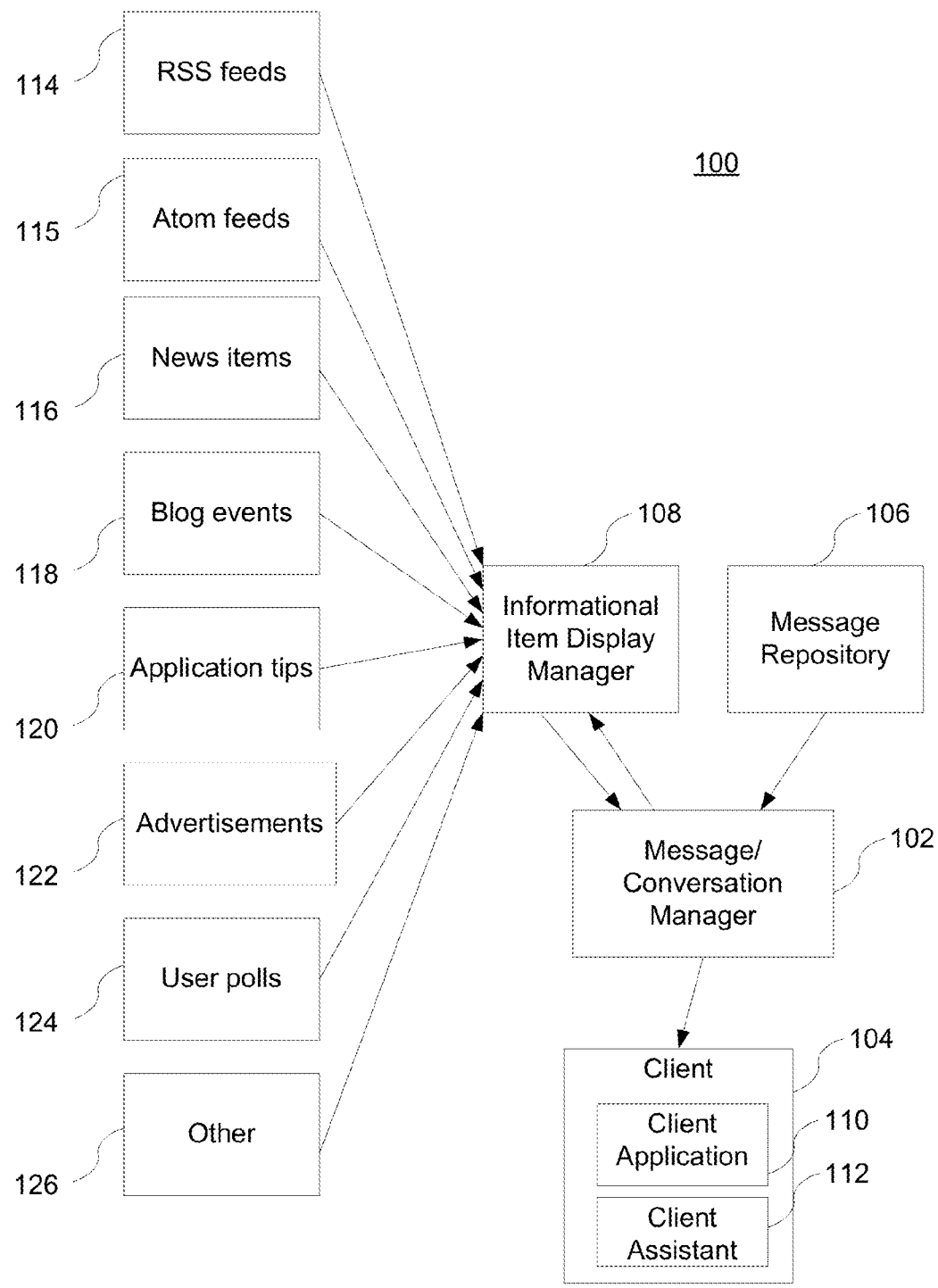
FIG. 1 illustrates a high level functional description of a system in accordance with some embodiments of the present invention.

FIG. 1 is a conceptual depiction of an information distribution system 100. A message or conversation manager 102 is connected to a client 104, a message repository 106 and an informational item display manager 108. The message/conversation manager 102 responds to requests from client 104 and provides messages from the message repository 106 and information in various formats to the client 104. The client requests may be generated in response to activities performed by a user at the client 104, such as displaying email messages or conversations, viewing web pages or other documents, or the like. The message/conversation manager 102 sends various informational items as part of the information and messages sent to the client 104. The informational item display manager 108 is connected to one or more information sources. FIG. 1 illustrates a number of exemplary types of sources of information. The information sources may include RSS feeds 114, news items 116, informational items from blogs (web logs) 118, application tips 120, advertisements 122, user polls 124 and other types of information 126. FIG. 1 illustrates exemplary types of sources of informational items. In some embodiments, the information sources may include a subset of those shown in FIG. 1, and may further include additional types of information sources. Each type of information source may include one or more sources of informational items of that type. For example, a user may be presented with or identify one or more RSS feeds, each of which produces informational items which may or may not be from the same content provider. In some embodiments, the informational item display manager 108 coordinates the retrieval and/or selection of information from the information sources which it subsequently provides to the message/conversation manager 102 for incorporation into the message display information sent to the client 104. In some embodiments, the message/conversation manager 102 combines the informational items received from the informational item display manager 108 and the messages and/or conversations received from the message repository 106 into display information which is transmitted to the client 104. At the client 104, the display information is received by the client assistant 112 and ultimately displayed to the user via the client application 110.

RSS feeds 114 are content distributed from various sources on the web. RDF Site Summary (RSS) is an XML-based lightweight multipurpose extensible metadata description and syndication format. RSS is typically used for distributing various types of content to a number of receivers simultaneously. News items 116 may include news items from one or more sources. In some embodiments, the news items are retrieved by the informational item display manager 108 in an active mode (e.g., requesting the news items from identified sources) and in some embodiments the news items are received by the informational item display manager 108 in a passive mode (e.g., the news item source sends news items to the informational item display manger 108 automatically— for example, when the news items are sent to registered subscribers). The blog events 118 are events generated from one or more web logs (blogs). As with the new items 116, the blog events may be passively received or actively retrieved. The application tips 120 are one or more tips for using the particular application with which the user is interacting. In some embodiments, the application is an application used to create, read and send messages and in some embodiments, the application is any other type of application with which the user can interact (e.g., word processor). The advertisements 122 are on-line advertisements which may be selected based on relevancy to the information displayed (or about to be displayed) at the client 104 (e.g., information in a displayed message or conversation). The user polls 124 are polls in which the user has participated, or in which others have participated. User polls may come from a variety of sources. Other types of information 126 may also be gathered and presented on the client 104.

Figure 2:
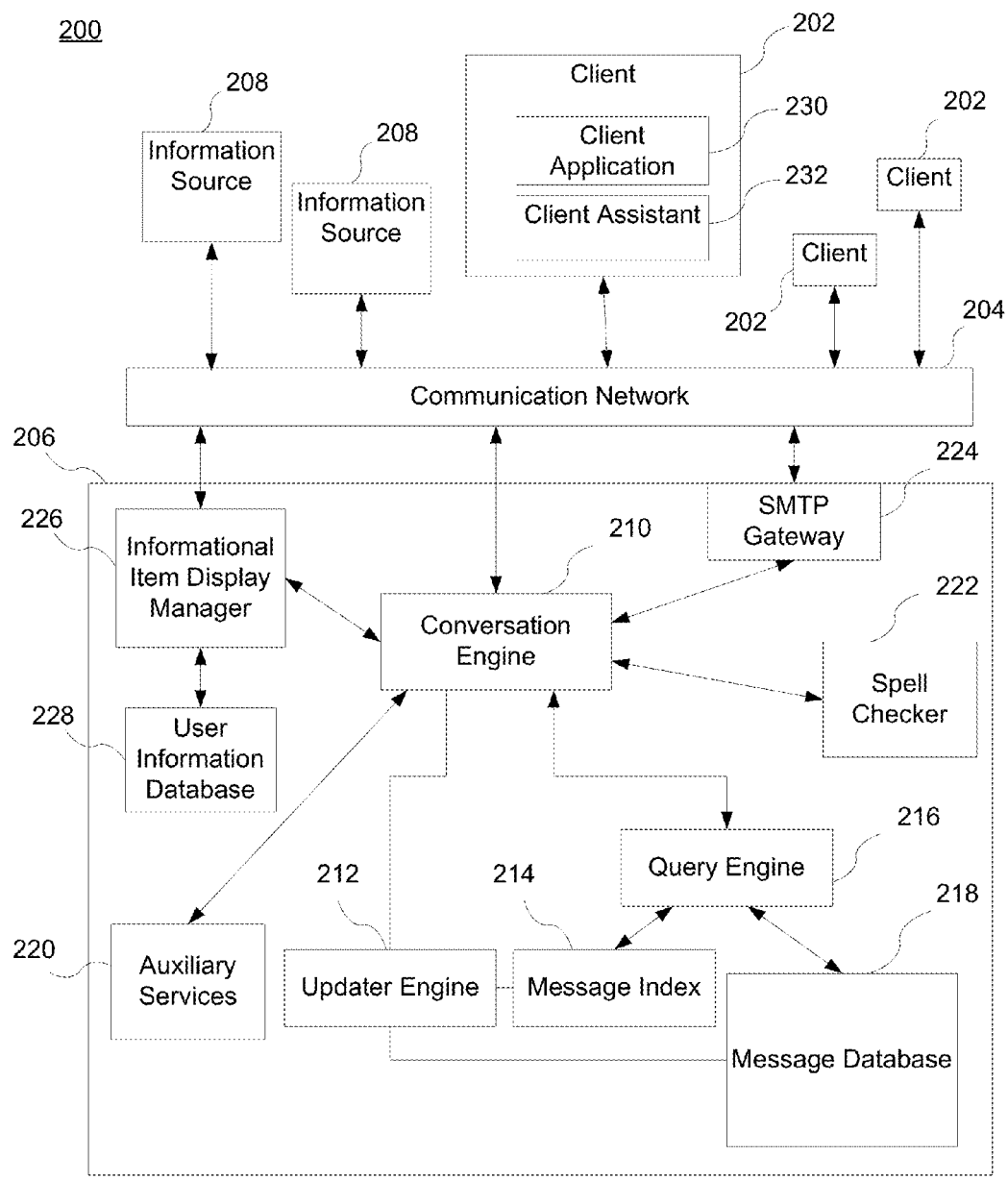
FIG. 2 depicts a block diagram of a system in accordance with some embodiments of the present invention.

FIG. 2 depicts an exemplary environment 200 for implementing some embodiments. One or more clients 202 are connected to a communication network 204. The communication network 204 is connected to a conversation/message server 206. The communication network 204 is also connected to one or more information sources 208. Alternately, the conversation/message server 206 may be connected to one or more information sources 208 by a distinct communication network (e.g., a local area network or an intranet, not shown) from the one used to communicate with the clients 204; or the conversation/message server 206 may be connected to some information sources 208 by the communication network 204 and to other information sources by another communication network or channel (not shown).

The conversation/message server 206 includes a conversation engine 210, an updater engine 212, a message index 214, a query engine 216, a message database 218, one or more auxiliary services servers 220, a spell checker 222, an SMTP gateway 224, and an informational item display manager 226. The informational item display manager 226 is connected to a user information database 228 and to the communication network 204.

Each client 202 includes a client application 230 and a client assistant 232. The client 202 can be any number of devices (e.g., computer, internet kiosk, personal digital assistant, cell phone, gaming device, desktop computer, laptop computer, set-top box) which may be used to connect to the communication network 204. The communication network 204 may be a wireless, optical, wired or other type of network that facilitates the passage of information. It may include the Internet, one or more local area networks (LANs), one or more wide area networks (WANs), other types networks, or a combination of such networks. The client application 230 is an application that is executed by the client (e.g., browser, e-mail client, word processor) and that displays or presents information to a user of the client (the client application may also perform other tasks not relevant to the present discussion). The client assistant 232 is an application that facilitates the display or presentation of information by the client application 230. The client assistant 232 can be part of the client application 230, a plug-in to the client application 230, standalone application, or otherwise (e.g., a JavaScript application downloaded as part of a web page). In some embodiments, the client assistant 232, or portions of the client assistant are downloaded along with messages or other information sent to the client 202. For instance, the client assistant 232 may be one or more scripts (e.g., JavaScript programs) embedded in other content. In this way, different versions of the client assistant 232 are provided to the client 202 without requiring any explicit action by the user of the client 202.

The conversation engine 210 handles requests from and responses to the client assistant 232, via its connection with communication network 204. The conversation engine 210 is also connected to various auxiliary services such as auxiliary services servers 220 and spell checker 222. A query engine 216 is connected to the conversation engine 210, the message index 214, and the message database 218. An updater engine 212 is connected between the conversation engine 210 and message index 214 as well as message database 218. The SMTP gateway 224 is connected between the conversation engine 210 and the communication network 204.

FIG. 2 is exemplary, in some embodiments, the conversation/message server 206 contains a subset of or superset of those elements illustrated in FIG. 2. Although FIG. 2 shows the conversation/message server 206 as a number of discrete items, the figure is intended more as a functional description of the various features which may be present in the conversation/message server 206 rather than a structural schematic of the embodiments described herein. In practice, and as recognized by those of ordinary skill in the art, items shown separately could be combined and some items could be separated. For example, some items shown separately in the figure could be implemented on a single server and single items could be implemented by one or more servers. The actual number of servers in conversation/message server 206 and how features are allocated among them will vary from one implementation to another, and may depend in part on the amount of email traffic that the system must handle during peak usage periods as well as during average usage periods. For example, the user information database 228 could be implemented as a stand-alone server or servers. The message database 218 could be implemented using a plurality of servers.

As briefly mentioned above, the conversation engine 210 may respond to a variety of requests from the client assistant 232 related to messages and return conversation-based responses via its connection with the communication network 204. Although, the SMTP gateway 224 may also be connected to the communication network 204, the SMTP gateway 224 may be more directly involved in receiving and sending messages. In some embodiments, the SMTP gateway 224, for example, transmits and receives messages using the simple mail transfer protocol (SMTP). The SMTP gateway 224 may receive a new message from the communication network 204 and send the message to conversation engine 210 for additional processing. Additionally, the SMTP gateway 224 receives messages from the conversation engine 210 and then transmits (via the communication network 204) those messages to the recipient addresses specified in the messages.

The conversation engine 210 may also handle requests for spell checking a message composed by a user of the client 202. The conversation engine 210 sends the portions of the text to be checked to the spell checker 222 for spell checking. The spell checker 222 returns information including an identification of any text identified as potentially incorrectly spelled.

The one or more auxiliary services servers 220 provide additional services to the conversation engine 210. In some embodiments, the auxiliary services servers 220 include a spam detection module. In some embodiments, the auxiliary services servers 220 include an attachment management module, which manages the efficient storage and retrieval of files attached to email messages.

The conversation engine 210 is also attached to the informational item display manager 226. The informational item display manager 226 determines which informational items should be displayed along with the messages and/or conversations based on, depending on the circumstances, one or more of the display view of the messaging application, the content of the messages and/or conversations, and certain probabilistic display characteristics (described below). The user information database 228 contains information about users, including any preferences they may have with respect to the display of the informational items. For example, a user may select one or more types of informational items to be displayed. The user may also identify desired or preferred sources of informational items for a one or more types of informational items (e.g., Google news as a news source). The informational item display manager 226 is also connected to the communication network 204. The informational item display manager 226 passively receives and/or actively retrieves (as the case may be) various information associated with the informational items. For example, the informational item display manager 226 may query a news server for recent news stories.

Figure 3:
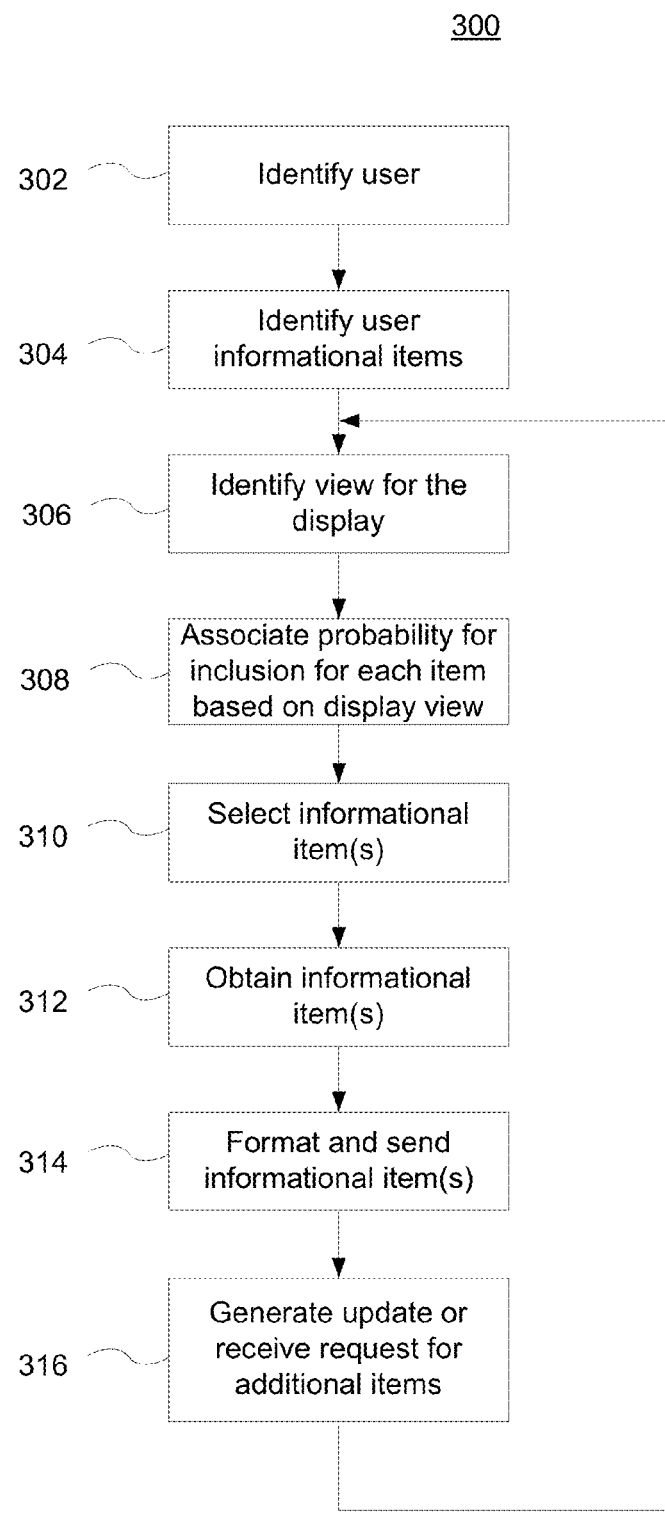
FIG. 3 depicts a process of enhancing a user's display in accordance with some embodiments of the present invention.

FIG. 3 shows an exemplary process 300 according to some embodiments of the invention for identifying and formatting informational items. Initially a user is identified (302). In some embodiments, a user is identified using a cookie supplied by the client 202. In some embodiments, the user is identified while logging into a service, such as an email server or website. Informational items are then identified for a user (304). In some embodiments, informational items are provided by the informational item display manager 226 from a default list of informational items (e.g., news sources, advertisements). In some embodiments, a user identifies (e.g., using one or more configuration web pages) types of informational items to be presented via a configuration screen, or provides preference information identifying certain types of informational items and/or certain sources of informational items. In some embodiments, a user provides input identifying informational items the user desires to have presented (e.g., entering the source location for an RSS feed). In some embodiments, the user informational items identified at 304 are based on a combination of the above.

In some embodiments, the display view of the messaging application impacts the selection of informational items to display. Accordingly, a current view is identified (306). A request for informational items to the client assistant 232 includes an indicator of the view for the informational items to be displayed. As will be explained below in more detail, the request can be generated from a current view or the request can be for a view which will be the next view displayed to the user. Using the identified display view, an associated probability is identified for each informational item or type of informational item identified in 304 (308). In some embodiments, the identification of informational items (304) is performed after the identification of the display view (306). For instance, first and second display views may have different sets of associated informational item types.

According to some embodiments, each display view has associated with it a different set of display probabilities for the various types of informational items. For example, the display probability of a particular informational item type (e.g., advertisements, or news items) may be higher for a first type of display view (e.g., InBox) than a second type of display view (e.g., a conversation or message view).

Different embodiments make use of different applications of the probabilities. For example, in some embodiments, the probabilities are associated with information types (e.g., news items, advertisements), and in some embodiments, the probabilities are associated with specific information sources (e.g., news items from Google news might have different display probabilities than news items from another news source). In some embodiments, the probabilities are determined according to a default set of probabilities. For example, the default set of probabilities may include default probability values for N information types (where N is an integer greater than 1, such as a value between 2 and 10). In some embodiments the default set of probabilities may include default probability values for specific information sources when an information type is associated with more than one information source. In some embodiments, the user sets the probabilities of one or more of the information types or one or more of the information sources. And, in some embodiments, the probabilities are set using a combination of system supplied probabilities and user assigned or adjusted probabilities.

Using the associated probabilities, one of the informational items is chosen for display to the user in the scrollable display area (310). In one embodiment, this is accomplished by generating a number within a defined range (e.g., 0 to 1) using a random or pseudo-random number generator, and then mapping that number to an informational item in accordance with the set of probabilities values associated to the information sources. To be more specific, each of the information sources or information types is assigned a portion of the defined range in accordance with its probability value. In this way, all values in the defined range are associated with a single information source or information type. When a randomly or pseudo-randomly selected value is generated, it identifies a single information source or type.

In some embodiments, a plurality of informational items are identified. For instance, a plurality of randomly or pseudo-randomly selected values may be generated and then mapped to a corresponding number of informational items. Once the item (or items as the case may be) is identified, the associated information of the informational item is obtained (312). In some embodiments, this means requesting information from the informational item source (e.g., querying the news source for the item). In some embodiments, the information is received during background processing and the information may be obtained by querying the location holding the received information (e.g., from informational item display manager 226). In some embodiments, information may be retrieved from either location. In some embodiments, the informational item is related to the content of one or more areas of the display. For example, in some embodiments, an advertisement is obtained based on a relation to the content being displayed to the user (e.g., the text of an e-mail message or conversation). Certain advertisements may be associated with the presence of words or phrases in the content displayed to the user. In some embodiments, advertisers may bid on certain key words or phrases and the advertisement associated with the winning bid is selected.

The information is formatted for display in the scrollable area and sent to the client (314). The formatting consists of extracting and formatting information to display in accordance with a scrollable area template. For example, the extracted information may include a title and a link to the information source (e.g., a network location). Optionally, the extracted information may also include one or more of the following: a snippet of information about the informational item, and/or a date/time value associated with the informational item. The formatted information may be sent in a number of ways depending on the various embodiments. For example, the formatted information can be sent to a JavaScript program (e.g., client assistant 232) which is downloaded and used to process message information. In one embodiment, the JavaScript program does not stay resident at the client 202 after the client assistant 232 is terminated. This embodiment provides an advantage in that the JavaScript program may be modified at the conversation/message server 206 without requiring any modification to the client or software residing at the client. As another example, the formatted information can be sent in a separate data stream to the client assistant 232.

After the informational item is formatted and sent to the client 204, the process waits until a next trigger event (316) before identifying another informational item to format and send. In some embodiments, the trigger event is receiving a request for more informational items from the client assistant 232. As will be described below, the client assistant may request more informational items based on various events. In some embodiments, new informational items may be periodically determined by the process. For example, the client assistant 232 may automatically generate a request for a new informational item after the expiration of a determined period of time (e.g., one minute). Or, in some embodiments, the conversation engine 210 may indicate a change in display view and the process will generate an informational item to be sent along with the new display view information.

In FIG. 4, table 402 illustrates one embodiment of a probability relationship between one or more display views 404 and one or more sources 406. Table 402 includes exemplary types of informational items including RSS Feeds 408, advertisements 410, stock prices 412, news items 414 and other 416. Information types 406 are only exemplary and in some embodiments, information types 406 include a superset, or a subset of the sources illustrated in table 402. Table 402 includes display views 402 which include one or more of the display views presented to a user during execution of a messaging application including an InBox view 418, a conversation view 420, a message compose view 422, a contact entry view 424 (i.e., a view displayed while entering or viewing contact information for a person or organization), and a view 426 representing other views. The display views 404 listed in FIG. 4 are only exemplary and in some embodiments the display views 404 used include a subset of the display views illustrated in table 402, and may include additional display views as well. Table 402 is used to determine the probability of display for an informational item for a particular identified display view type, such as that identified in 308 of FIG. 3. For example, when the identified display view type is a compose view type 422, a corresponding probability of display for an informational item of an advertisement type is 50% (as shown at 428) and the display probability of a news item is 30% (as shown at 430). Table 402 illustrates exemplary probability values; the actual probability values may vary from one embodiment to another and may also vary from one user or client to another. In some embodiments, the probability values for each display view are normalized, so that they sum to a predefined value, such as 1.0.

Figure 5:
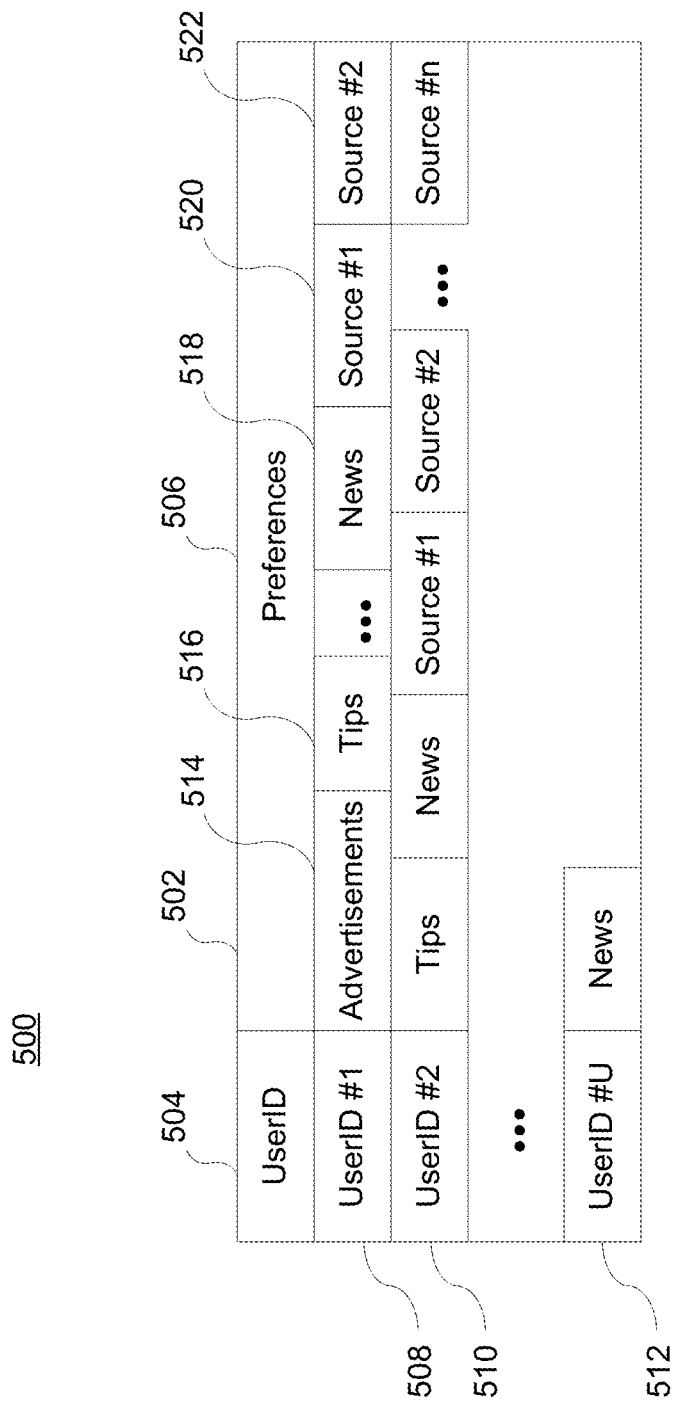
FIG. 5 depicts a data structure for storing certain user preferences in accordance with some embodiments of the present invention.

FIG. 5 illustrates an exemplary user preference table 502 in a user information database 500 which is used in some embodiments to personalize the informational items displayed to the user. The user preference table 502 stores preference information associated with particular user indicting a user's preference to have displayed certain informational items. In some embodiments, the information in table 502, if any, is used to override any default settings for the types of informational items to be displayed (e.g., a user may choose not to see a particular type of informational item). In some embodiments, the information in table 502 can be used to preferentially treat any items associated with a user in the table 502 (e.g., the probabilities of table 402 may be weighted toward informational items that the user has expressed a preference for in table 502). In some embodiments, table 502 includes a plurality of records, each having a userID portion 504 and a preferences portion 506. The table 502 includes one or more records such as record 508 associated with a UserID #1, record 510 associated with a UserID #2, and a record 512 associated with a UserID #U, where U represents the number of users with a record in the table 502. The record 508 includes one or more preference identifiers such as advertisements 514, tips 516, news 518, source #1 520 and source #2 522 (where source#1 and source#2 represent the addresses or other identifiers of particular information types or information sources). The entries in any particular record 508, 510 and 512 of table 502 are merely exemplary. In some embodiments, users may have differing sets of entries in their respective record. As illustrated in FIG. 5, a record 510 includes a different set of entries as compared to the records 508 and 512. Table 502 may also be used to store any user entered sources of informational items such as selected RSS feeds. Such feeds would be stored in entries such as entry 520, 522. An entry 520 might include the URL address of the RSS feed. The user preference entries in the records 508, 510, 512 may furthermore include weights or preference factors for one or more identified information types of information sources. For instance, a weight or preference factor of 2.0 might indicate that the relative probability of an associated information type or source is to be doubled from a default or nominal value, while a weight or preference factor of 0.5 might indicate that the relative probability of an associated information type or source is to be decreased by a factor of 50 percent from a default or nominal value.

Figure 6:
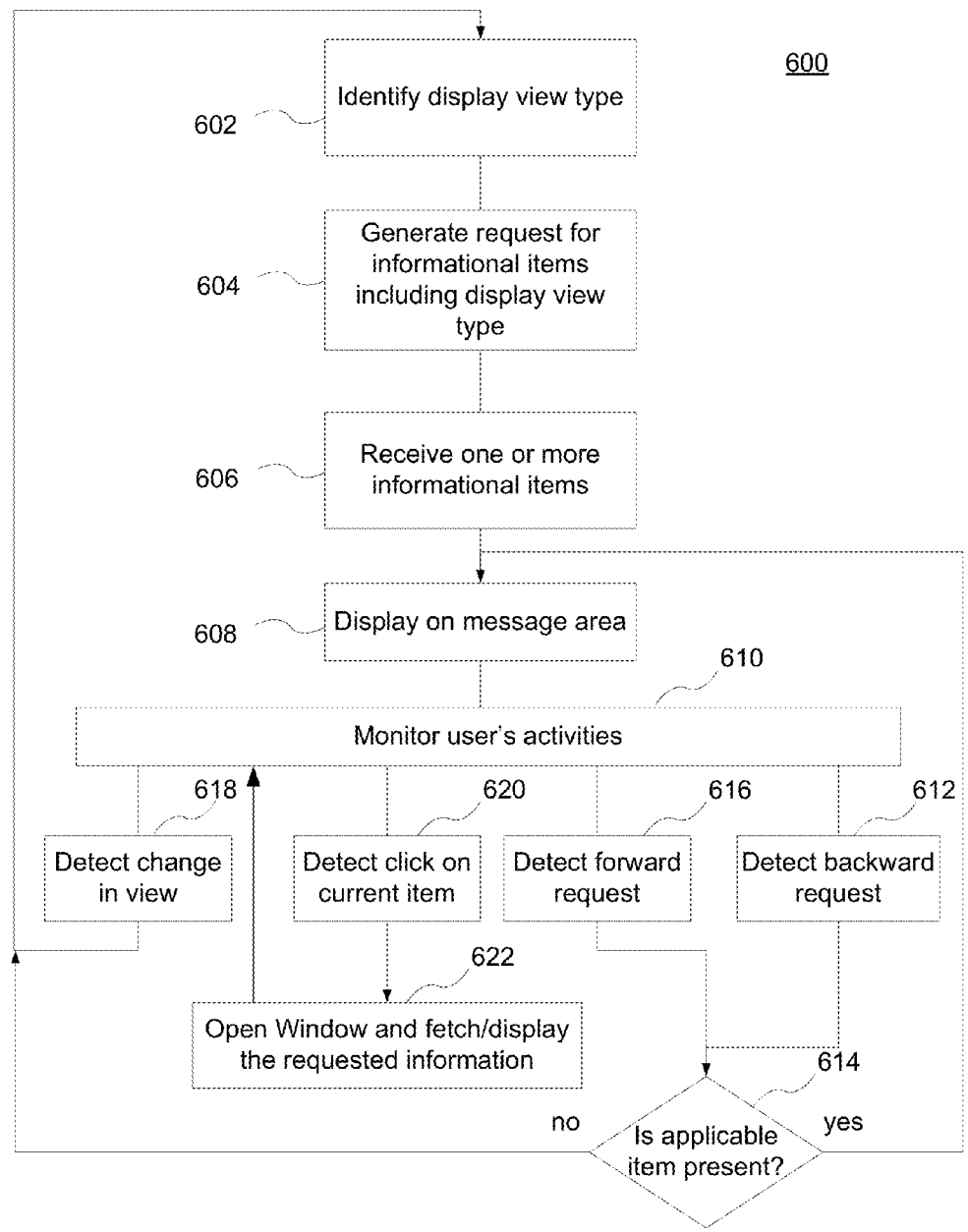
FIG. 6 depicts a process for displaying informational items and monitoring a user's activities in accordance with some embodiments of the present invention.

FIG. 6 illustrates an exemplary process 600 which executes in the client assistant 232 according to some embodiments.

Initially, a display view type is identified (602). The client assistant 232 identifies which display is being presented to the user, such as an InBox view, a compose view or any other type of view. For example, the client assistant 232 may also maintain an address book or contact list and may have various displays associated with that feature. Alternatively, the client assistant 232 may identify the next display view to be presented to the user. For example, when the user selects a different view (e.g., selecting a compose message view from the InBox view), the client assistant 232 may identify the display view of the compose message display as the next view to be displayed to the user.

The client assistant 232 then generates a request for informational items (604). In some embodiments this is done prior to rendering the display view, and in some embodiments, this is done during or after rendering the display view. In some embodiments, the client sends identifiers of the content being displayed such that informational items to be content related can be identified. The client assistant 232 receives the informational item from the conversation/message server 206 (606) and displays it in the message area in the scrollable display portion of the display area using the formatted information received (e.g., identifying the title and textual description of the informational item). The user's activities are monitored (610). If the user chooses to see a previously displayed informational item (612) (e.g., by selecting an appropriate button or icon) then a determination is made as to whether the informational item is currently in a memory associated with the client assistant 232 (e.g., a cache). In some embodiments, the client assistant 232 maintains a number of previously displayed informational items in memory. If the applicable informational item is present (614-yes) then the informational item is displayed again (608). If the informational item is not present (614-no), then in some embodiments another informational item can be requested beginning at 602. In other embodiments, the last informational item still present in memory is displayed when the user makes a previous request for an item that is not present. If, on the other hand a user makes a forward request (616) (e.g., by selecting an appropriate button or icon) a determination is then a determination is made as to whether the next informational item is currently in the memory. In some embodiments, the informational items received at 606 include a number of future informational items associated with the current display. In some embodiments, the future informational items include informational items associated with other display views (e.g., in anticipation of a change of display view). If the informational item is in the memory (614-yes), then it is displayed (608). On the other hand, if is not (614-no) then another informational item is requested beginning at 602. Instead of choosing to see a previous or next informational item, the user may choose an option that changes the display view (618) (e.g., by selecting a conversation view from an InBox view). In this instance, a new request for informational items including the new display view type is begun starting at 602.

In the event that the user clicks or otherwise selects a currently displayed informational item (620), the client application or client assistant opens a new display window, fetches a web page or other information at a location associated with the selected informational item, and displays that information in the new window (622).

Figure 7:
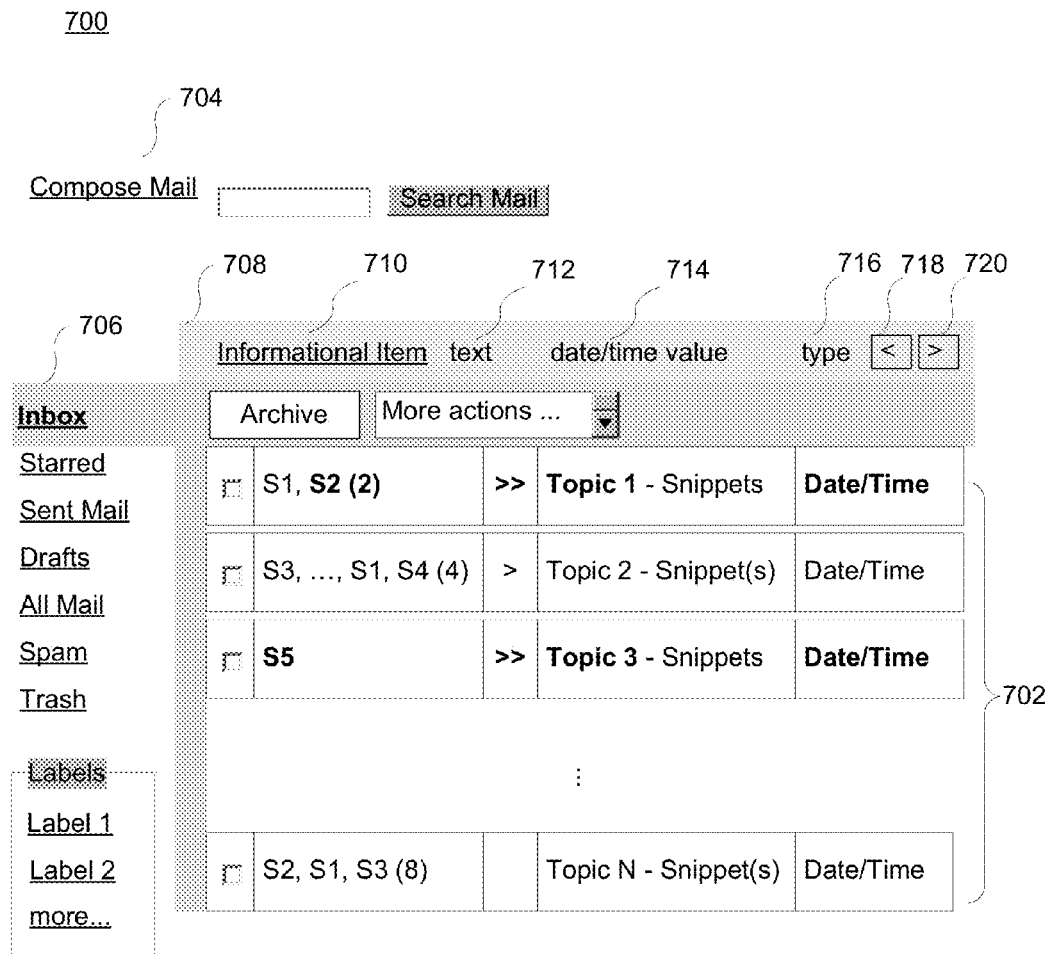
FIG. 7 depicts an InBox view of a message display in accordance with some embodiments of the present invention.

FIG. 7 illustrates an exemplary InBox view 700 showing an informational item in accordance with some embodiments. The InBox view 700 may include one or more display portions such as display portions 702, 704 and 706. The display portion 702 displays a list of conversations to the user. The navigation portion 704 may provide a number of function choices to the user (e.g., search, compose). The navigation portion 706 includes various choices which the user may select, many of which cause a change in the display view type. The InBox view also contains scrollable display area 708 in which the informational item is displayed. A displayed informational item, as displayed within display area 708, includes a descriptive link 710 (e.g., a link with anchor text, such as a title) which, if the user clicks on it will cause the user to be presented additional information about the informational item or to be taken to the source of the informational item (e.g., in a pop-up window, or another window, or display). For example, clicking on the link 710 may cause a web page associated with a corresponding news item to be displayed in a separate window. In some embodiments a text snippet 712 is displayed. The text snippet 712 could be the first portion of a text content associated with the informational item (e.g., the link 710 might include a link to a network location and the title of a news article, and the snippet 712 might include the first few words of the news article). A time/date value 714 may be displayed which indicates to the user a date/time value associated with the informational item (e.g., the date at which the news items was posted to its source location) or the length of time since a date/time of the informational item (e.g., "2 hours ago"). In some embodiments, a type 716 indicates the type of informational item source (e.g., news, advertisement). A forward button 718 and a backward button 720 permit the user to select a next or previous informational item, respectively. These buttons 718, 720, when selected, scroll a list of informational items through the display area 708. In this example, display area 708 is configured to give the appearance of informational items scrolling horizontally through the display area 708. In other embodiments, informational items may be vertically scrolled through an informational item display area.

Figure 8:
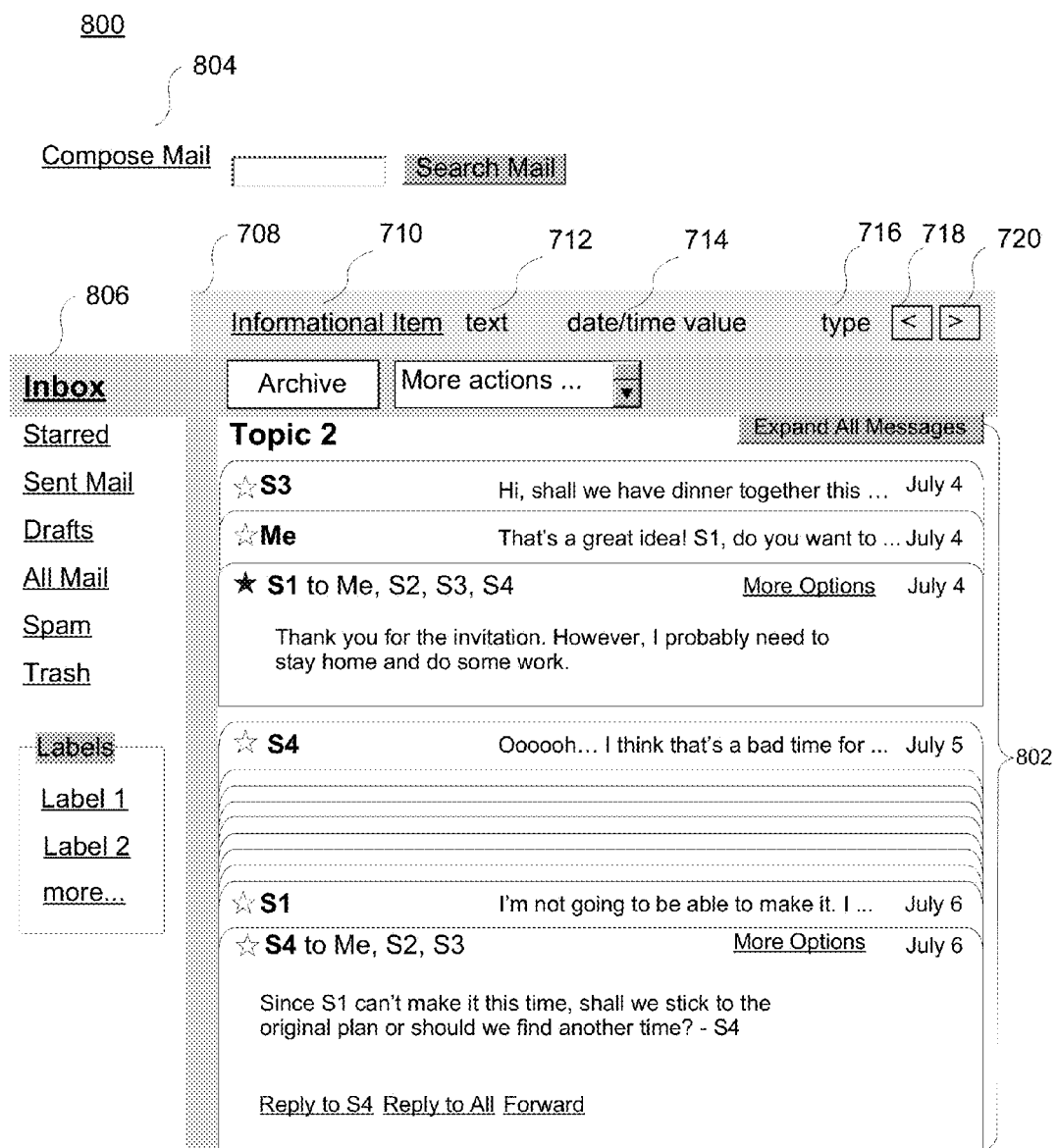
FIG. 8 depicts a conversational view of a message display in accordance with some embodiments of the present invention.

FIG. 8 illustrates an exemplary conversation view 800 showing an informational item in accordance with some embodiments of the invention. In this view, the messages associated with a particular conversation are displayed to the user in a display area 802. The conversation view includes navigation areas 804 and 806 which may be similar to those of 704 and 706 described in relation to FIG. 7. In some embodiments, the informational item 708 may be particularly relevant to the content of the messages being displayed in the message display area 802. For example, an advertisement identified by the informational item in the informational display area 708 may be selected based on the content of the messages being displayed (e.g., if the messages contained one or more references to dogs, an advertisement related to dog food might be presented).

Figure 9:
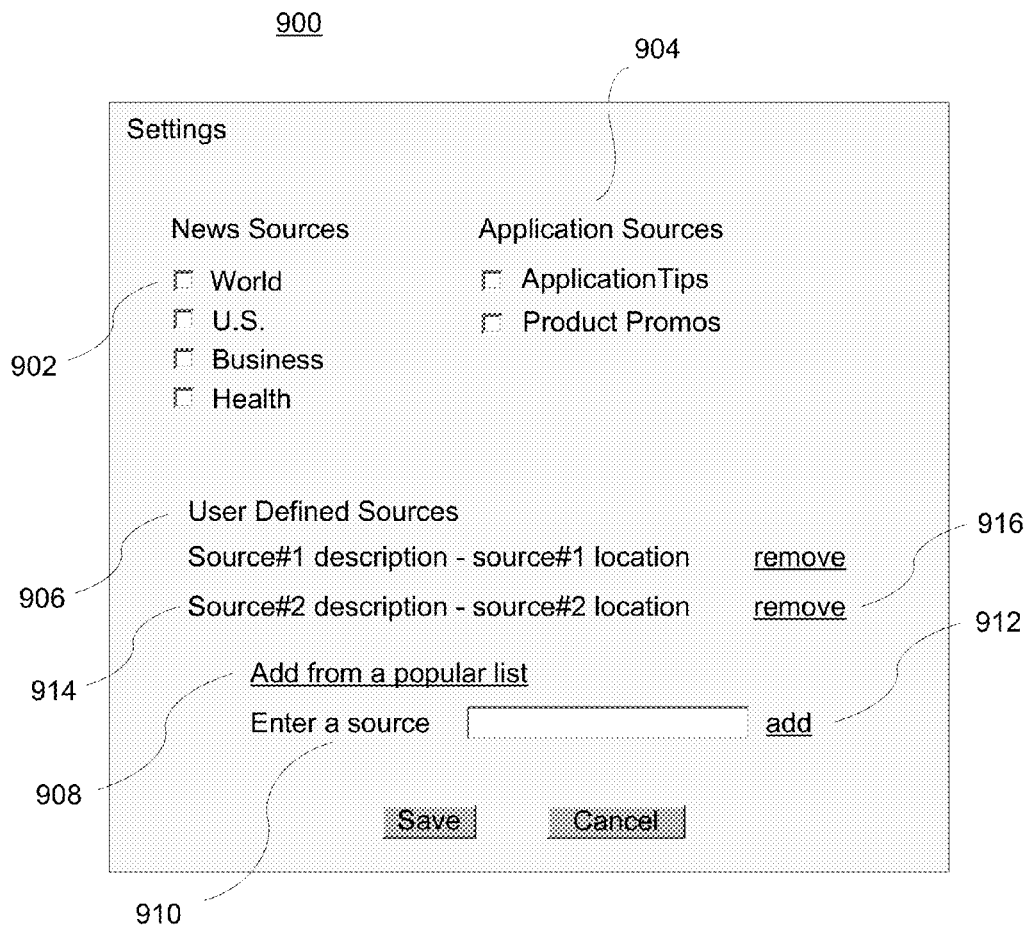
FIG. 9 depicts an exemplary user configuration window in accordance with some embodiments of the present invention.

FIG. 9 is an exemplary configuration display 900 for a user according to some embodiments. A user is presented with a window 900 which includes various configuration portions, such as news portion 902, application portion 904, and user defined portion 906. In some embodiments, a subset or superset of the portions are presented to the user in the configuration display 900. In the news portion 902, the user is presented with check boxes for one or more news types, herein called sub-items. The sub-item choices shown in FIG. 9 are merely exemplary. When a user selects the check box associated with a sub-item, a check mark or other visual indicator is provided and the associated information type or information source is added to the list of information types or sources associated with the user.

Application portion 904 permits a user to select from one or more information types or sources associated with the application, such as tips for using the application or promotions for future products.

According to some embodiments, when an information type is associated with a plurality of information sources, each information source will have an equal probability of being the source of an informational item to be displayed when that information type is selected for display. For example, if the "news" information type has a display probability of 60%, and there are four information sources associated with the news information type, then each of the news sources has a 15% change of being the source of the informational item displayed at any selected point in time. According to some embodiments, within the same information type, the associated information sources are selected in round-robin order. In some embodiments, a user is presented with various settings or options for setting or changing the priorities associated with particular information types and/or particular information sources.

In some embodiments, the configuration display 900 includes a user defined sources portion 906 that enables a user to add one or more information sources to his or her preferences profile. The identified information sources are added to the set of information sources used for generating informational items to presented to the user. In this example, a user may choose to select an informational item from a list of informational items sources by selecting the option at 908. When a user selects the option at 908, the user is presented with a list of sources from which to select. Further, in this example, a user may enter a source at option 910 in the text box associated with the option. After the user has entered the source address the user selects the "add" button 912. Sources that the user has added (via option 908 and/or option 910) appear in the user defined portions (e.g., Source #2 914). In this example, information sources may be removed by selecting a "remove" button (e.g., "remove" button 916).

Figure 10:
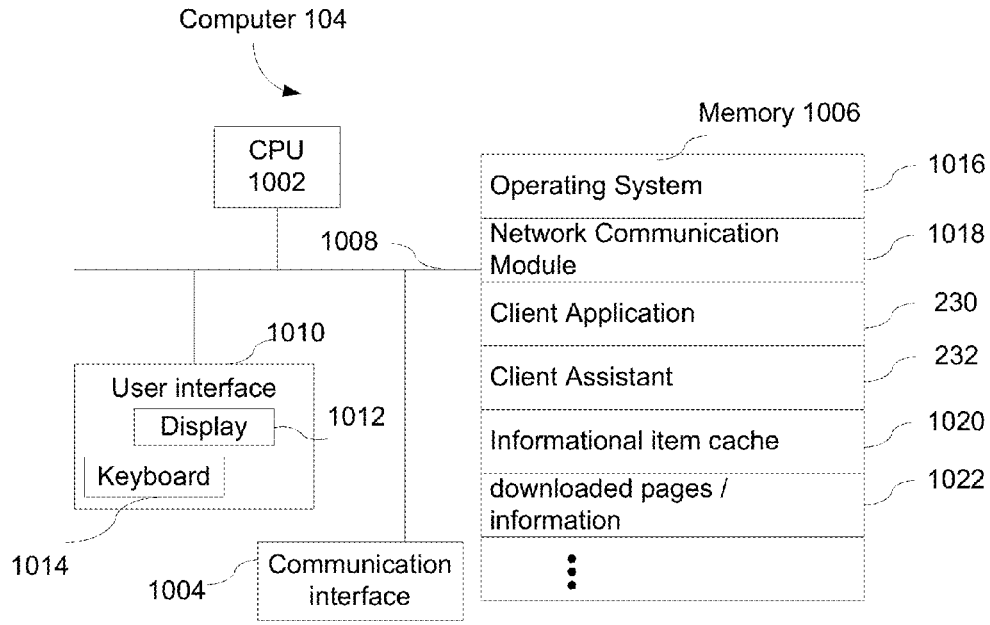
FIG. 10 depicts a client in accordance with some embodiments of the present invention.

Referring to FIG. 10, a client system 202 typically includes one or more processing units (CPU's) 1002, one or more network or other communications interfaces 1004, memory 1006, and one or more communication buses 1008 for interconnecting these components. The client system 202 may include a user interface 1010, for instance a display 1012 and a keyboard 1014. The memory 1006 may include high speed random access memory and may also include non-volatile memory, such as one or more magnetic or optical storage disks. The memory 1006 may include mass storage that is remotely located from CPU's 1702. The memory 1006 may store the following elements, or a subset or superset of such elements:

- an operating system 1016 that includes procedures for handling various basic system services and for performing hardware dependent tasks;
- a network communication module (or instructions) 1018 that is used for connecting the client system 104 to other computers via the one or more communications interfaces 1004 (wired or wireless), such as the Internet, other wide area networks, local area networks, metropolitan area networks, and so on;
- a client application 230 as described above;
- a client assistant 232 as described above;
- optionally, a cache 1020 of informational items; and
- downloaded web pages and/or other information, such as information for viewing using the client application 230, and information retrieved by user selection of one or more informational items.

Figure 11:
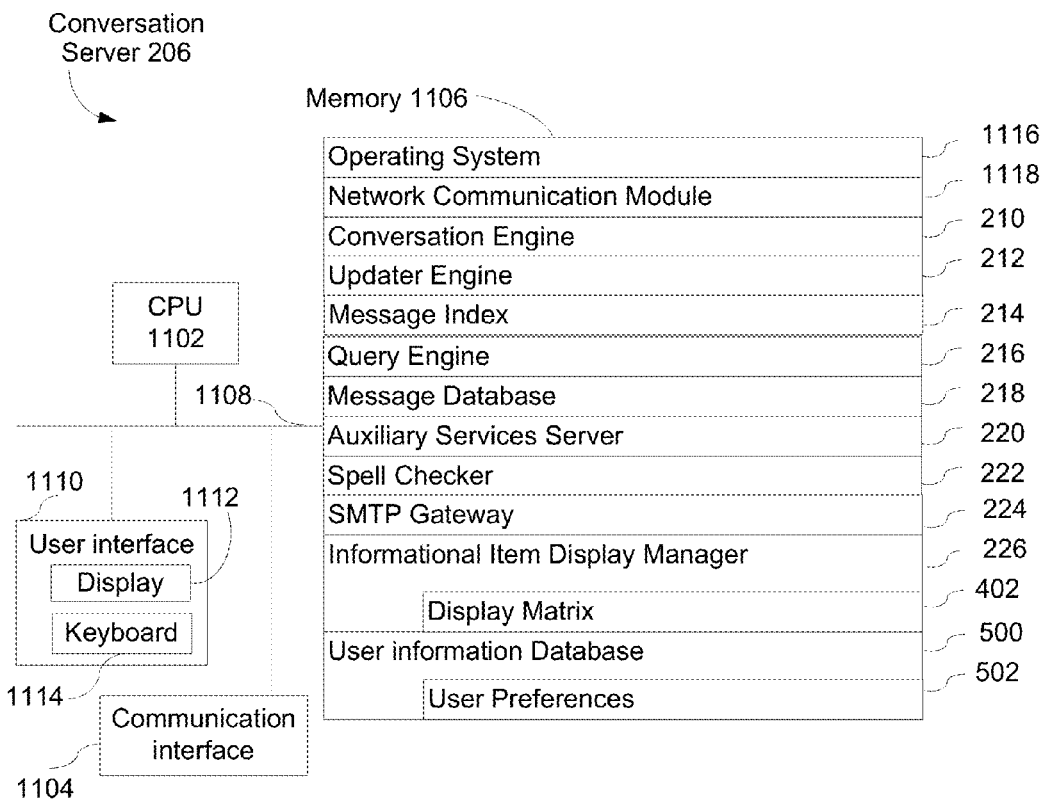
FIG. 11 depicts a server in accordance with some embodiments of the present invention.

Referring to FIG. 11, a conversation/message server 206 typically includes one or more processing units (CPU's) 1102, one or more network or other communications interfaces 1104, memory 1106, and one or more communication buses 1108 for interconnecting these components. The conversation/message server 206 may include a user interface 1110, including a display 1112 and a keyboard 1114. The memory 1106 may include high speed random access memory and may also include non-volatile memory, such as one or more magnetic or optical storage disks. The memory 1106 may include mass storage that is remotely located from CPU's 1102. The memory 1106 may store the following elements, or a subset or superset of such elements:

- an operating system 1116 that includes procedures for handling various basic system services and for performing hardware dependent tasks;
- a network communication module (or instructions) 1118 that is used for connecting the search engine 1100 to other computers via the one or more communications interfaces 1104 (wired or wireless), such as the Internet, other wide area networks, local area networks, metropolitan area networks, and so on;
- a conversation engine 210 (or instructions) for responding to requests from various clients 104;
- an informational item display manager (or instructions) 226 for identifying which informational items to display and for formatting the informational item for display in a scrollable area as described above, and including a display matrix 402 identifying various probabilities of display for various information sources depending on a display view type; and
- a user information database 500 for storing information, including user preferences 502 which indicate, among other things, which information types and/or information sources are selected and/or preferred for a particular user.

In some embodiments, the conversation/message server 206 includes the following elements, or a subset or superset of such elements: an updater engine 202 for updating a message database 218; a message index 214 containing index information for messages in the message database 218; a query engine 216 for performing various queries using the message index 214 and message database 218; a auxiliary services server 220 for performing various auxiliary services; spell checker 222 for enabling various spell checking features; and SMTP gateway 224 for sending and receiving messages.

Although illustrated and described in relation to a conversation-based message system, it should be understand that the techniques described herein apply equally well to a message-based message system (e.g., Outlook). Furthermore, one of ordinary skill in the art of computer science will readily recognize that the techniques described herein can be applied to client applications other than applications for viewing and composing messages.

Each of the above identified modules or programs corresponds to a set of instructions for performing a function described above. These modules and programs (i.e., sets of instructions) need not be implemented as separate software programs, procedures or modules, and thus various subsets of these modules may be combined or otherwise re-arranged in various embodiments. In some embodiments, memory 1006 or 1016 may store a subset of the modules and data structures identified above. Furthermore, memory 1006 or 1016 may store additional modules and data structures not described above.

Although some of various drawings illustrate a number of logical stages in a particular order, stages which are not order dependent may be reordered and other stages may be combined or broken out. Alternative orderings and groupings, whether described above or not, may be appropriate or obvious to those of ordinary skill in the art of computer science.

Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for enhancing email message display, comprising:
   at a server system having one or more processors and memory storing one or more programs for execution by the one or more processors, the one or more programs including instructions for:
   sending email message information to a client device associated with an identified user for display at the client device;
   selecting an informational item from among a set of respective information sources, the set of respective information sources corresponding to the identified user, the informational item including a user-selectable link to additional information corresponding to the selected informational item;
   sending the informational item to the client device for concurrent display with the email message information, wherein the displayed informational item includes said user-selectable link; and
   responding to a user-initiated request for a next information item by concurrently displaying the email message information and the next informational item, wherein the displayed next informational item is selected from among the set of respective information sources corresponding to the identified user and includes a user-selectable link to additional information corresponding to the next informational item.

2. The method of claim 1, further including:
   transmitting an email message to the client device; and
   embedding in the email message client device executable instructions for displaying the informational item in the display area.

3. The method of claim 1, wherein selecting the informational item includes identifying an informational item corresponding to content of one or more email messages sent to the client device for display.

4. The method of claim 1, wherein the set of respective information sources corresponding to the identified user comprises one or more information sources selected or identified by the user.

5. The method of claim 1, further comprising: prior to sending, formatting the informational item for display at the client device.

6. The computer-implemented method of claim 1, wherein the selecting an informational item from among a set of respective information sources is in accordance with a probability of display associated with the informational item.

7. The computer-implemented method of claim 1, wherein the selecting an informational item from among a set of respective information sources is in accordance with a probability of display associated with each respective information source within the set of respective information sources.

8. The computer-implemented method of claim 1, wherein sending the informational item to the client device for concurrent display with the email message information includes sending a type, associated with the informational item, for concurrent display with the informational item and the email message.

9. A computer-implemented method for enhancing email message display, comprising:
   on a client device having one or more processors and memory storing one or more programs for execution by the one or more processors, the one or more programs including instructions for:
   receiving from a server system email message information, associated with an identified user, for display at the client device;
   obtaining an informational item selected from among a set of respective information sources, the set of respective information sources corresponding to the identified user, the informational item including a user-selectable link to additional information corresponding to the informational item;
   concurrently displaying the informational item with the email message information, wherein the displayed informational item includes said user-selectable link; and
   responding to a user-initiated request for a next information item by concurrently displaying the email message information and the next informational item, wherein the displayed next informational item is selected from among the set of respective information sources corresponding to the identified user and includes a user-selectable link to additional information corresponding to the next informational item.

10. The method of claim 9, wherein obtaining the informational item includes obtaining an informational item corresponding to content of one or more email messages sent to the client device for display.

11. The method of claim 9, wherein the set of respective information sources corresponding to the identified user comprises one or more information sources selected or identified by the user.

12. The method of claim 9 further including:
    determining that the next informational item is not stored on the client device;
    in accordance with the determination that the next informational item is not stored on the client device, requesting the next informational item from another server system.

13. The computer-implemented method of claim 9, further comprising:
    responsive to a user-initiated request for a previously displayed informational item, concurrently displaying the previously displayed informational item with the email message information, wherein the previously displayed informational item includes a user-selectable link to additional information corresponding to the previously displayed informational item.

14. A non-transitory computer readable storage medium storing one or more programs configured to be executed by one or more processing units at a server system comprising:
    instructions for sending email message information to a client device for display at the client device;
    instructions for selecting an informational item from among a set of respective information sources, the set of respective information sources corresponding to the identified user, the informational item including a user-selectable link to additional information corresponding to the selected informational item;

instructions for sending the informational item to the client device for concurrent display with the email message information, wherein the displayed informational item includes said user-selectable link; and instructions for responding to a user-initiated request for a next information item by concurrently displaying the email message information and the next informational item, wherein the displayed next informational item is selected from among the set of respective information sources corresponding to the identified user and includes a user-selectable link to additional information corresponding to the next informational item.

15. The non-transitory computer readable storage medium of claim 14, further including instructions for transmitting email message to the client device; and instructions for embedding in email message client device executable instructions for displaying the informational item at the client device.

16. The non-transitory computer readable storage medium of claim 14, wherein the instructions for selecting the informational item include instructions for identifying an informational item corresponding to content of one or more email messages sent to the client device for display.

17. The non-transitory computer readable storage medium of claim 14, wherein the set of respective information sources corresponding to the identified user comprises one or more information sources selected or identified by the user.

18. The non-transitory computer readable storage medium of claim 14, further including: instructions for formatting the informational item for display prior to sending the informational item to the client device.

19. A non-transitory computer readable storage medium storing one or more programs configured to be executed by one or more processing units at a client device, the one or more programs comprising:

instructions for receiving from a server system email message information, associated with an identified user, for display at the client device;

instructions for obtaining an informational item from among a set of respective information sources, the set of respective information sources corresponding to the identified user, the informational item including a user-selectable link to additional information corresponding to the informational item;

instructions for concurrently displaying the informational item with the email message information, wherein the displayed informational item includes said user-selectable link; and instructions for responding to a user-initiated request for a next information item by concurrently displaying the email message information and the next informational item, wherein the displayed next informational item is selected from among the set of respective information sources corresponding to the identified user and includes a user-selectable link to additional information corresponding to the next informational item.

20. The non-transitory computer readable storage medium of claim 19, wherein instructions for obtaining the informational item includes instructions for obtaining an informational item corresponding to content of one or more email messages sent to the client device for display.

21. The non-transitory computer readable storage medium of claim 19, wherein the set of respective information sources corresponding to the identified user comprises one or more information sources selected or identified by the user.

22. The non-transitory computer readable storage medium of claim 19 further including:

instructions for determining that the next informational item is not stored on the client device;

instructions for requesting the next informational item from a server system in accordance with the determination that the next informational item is not stored on the client device.

23. A computer system for enhancing client message display, comprising:

one or more processors; and memory to store:

a plurality of informational items;

a plurality of messages associated with a user; and one or more programs, the one or more programs comprising:

instructions for sending email message information to a client device for display at the client device;

instructions for selecting an informational item from among a set of respective information sources, the set of respective information sources corresponding to the identified user, the informational item including a user-selectable link to additional information corresponding to the selected informational item;

instructions for sending the informational item to the client device for concurrent display with the email message information, wherein the displayed informational item includes said user-selectable link; and instructions for responding to a user-initiated request for a next information item by concurrently displaying the email message information and the next informational item, wherein the displayed next informational item is selected from among the set of respective information sources corresponding to the identified user and includes a user-selectable link to additional information corresponding to the next informational item.

24. The computer system of claim 23, the one or more programs including:

instructions for transmitting an email message to the client device; and instructions for embedding in the email message client device executable instructions for displaying the informational item at the client device.

25. The computer system of claim 23, the one or more programs including:

instructions for identifying an informational item corresponding to content of one or more email messages sent to the client device for display.

26. The computer system of claim 23, wherein the set of respective information sources corresponding to the identified user comprises one or more information sources selected or identified by the user.

27. The computer system of claim 23, the one or more programs including:

instructions for formatting the informational item for display prior to sending the informational item to the client device.

28. A computer system for enhancing client message display on a client device, comprising:

one or more processors; and memory to store:

at least one informational item; and one or more programs, the one or more programs comprising:

instructions for receiving from a server system email message information, associated with an identified user, for display at the client device;

instructions for obtaining an informational item from among a set of respective information sources, the set of respective information sources corresponding to the identified user, the informational item including a user-selectable link to additional information corresponding to the informational item;

instructions for concurrently displaying the informational item with the email message information, wherein the displayed information includes said user-selectable link; and instructions for responding to a user-initiated request for a next information item by concurrently displaying the email message information and the next informational item, wherein the displayed next informational item is selected from among the set of respective information sources corresponding to the identified user and includes a user-selectable link to additional information corresponding to the next informational item.

29. The computer system of claim 28, wherein instructions for obtaining an informational item comprise instructions for obtaining an informational item corresponding to content of one or more email messages sent to the client device for display.

30. The computer system of claim 28, wherein the set of respective information sources corresponding to the identified user comprises one or more information sources selected or identified by the user.

31. The computer system of claim 28 the one or more programs further comprising instructions for :

determining that the next informational item is not stored on the client device;

requesting the next informational item from another server system in accordance with the determination that the next informational item is not stored on the client device.

* * * * *